United States Patent
Stapp et al.

[11] Patent Number: 5,867,328
[45] Date of Patent: Feb. 2, 1999

[54] EXTERNAL MIRROR FOR A MOTOR VEHICLE

[75] Inventors: Armin Stapp, Elsenfeld; Edwin Seitz, Stadtprozelten, both of Germany

[73] Assignee: Hohe GmbH & Co. KG, Collenberg, Germany

[21] Appl. No.: 612,404

[22] Filed: Mar. 7, 1996

[30] Foreign Application Priority Data

Jun. 15, 1995 [DE] Germany ................. 195 21 432.3

[51] Int. Cl.⁶ .................. G02B 5/08; G02B 7/18; F16M 13/00; A47F 7/14
[52] U.S. Cl. ............... 359/841; 248/549; 248/900
[58] Field of Search .................. 359/841, 871, 359/872; 248/479, 476, 477, 549, 900

[56] References Cited

U.S. PATENT DOCUMENTS

| 5,190,499 | 3/1993 | Mori et al. ................ 464/36 |
| 5,477,392 | 12/1995 | Mochizuki et al. ............. 359/841 |
| 5,594,590 | 1/1997 | Ishiyama ................ 359/841 |

FOREIGN PATENT DOCUMENTS

| 0 166 378 | 1/1986 | European Pat. Off. . |
| 40 23 375 | 1/1992 | Germany . |
| 62-101558 | 5/1987 | Japan . |
| 62-131843 | 6/1987 | Japan . |
| 2-136347 | 5/1990 | Japan . |
| 6-115400 | 4/1994 | Japan . |

*Primary Examiner*—Cassandra C. Spyrou
*Assistant Examiner*—Mark A. Robinson
*Attorney, Agent, or Firm*—Jacobson, Price, Holman & Stern, PLLC

[57] ABSTRACT

An external mirror for a motor vehicle includes a mirror base attachable to the vehicle, a mirror head which bears a mirror, which head can be rotated relative to the base by a motor, and which is mounted on the mirror base by an articulation, and when subjected to an impulse can yield in a deflection direction in which it is tilted toward the vehicle from the operating position of the mirror head. The articulation includes a tubular element fixed to the mirror base, and the articulation further has a bushing which is pressed coaxially over the tubular element by a spring, and a mechanism for limiting the rotational excursion of the mirror head around the tubular element. To provide for simpler and easier manufacture of the mirror device, it is provided with limits for the motor-driven rotational excursion, which include at least two interacting elements, one of which elements is disposed on the mirror head and the other on a catch piece which is disposed on the articulation coaxially to the tubular element and is driven by the motor, and limits for the impulse-generated tilting deflection, including a projection and a detent, wherewith one of these two elements is mounted on the mirror base and the other is mounted on the mirror head or on the catch piece.

15 Claims, 6 Drawing Sheets

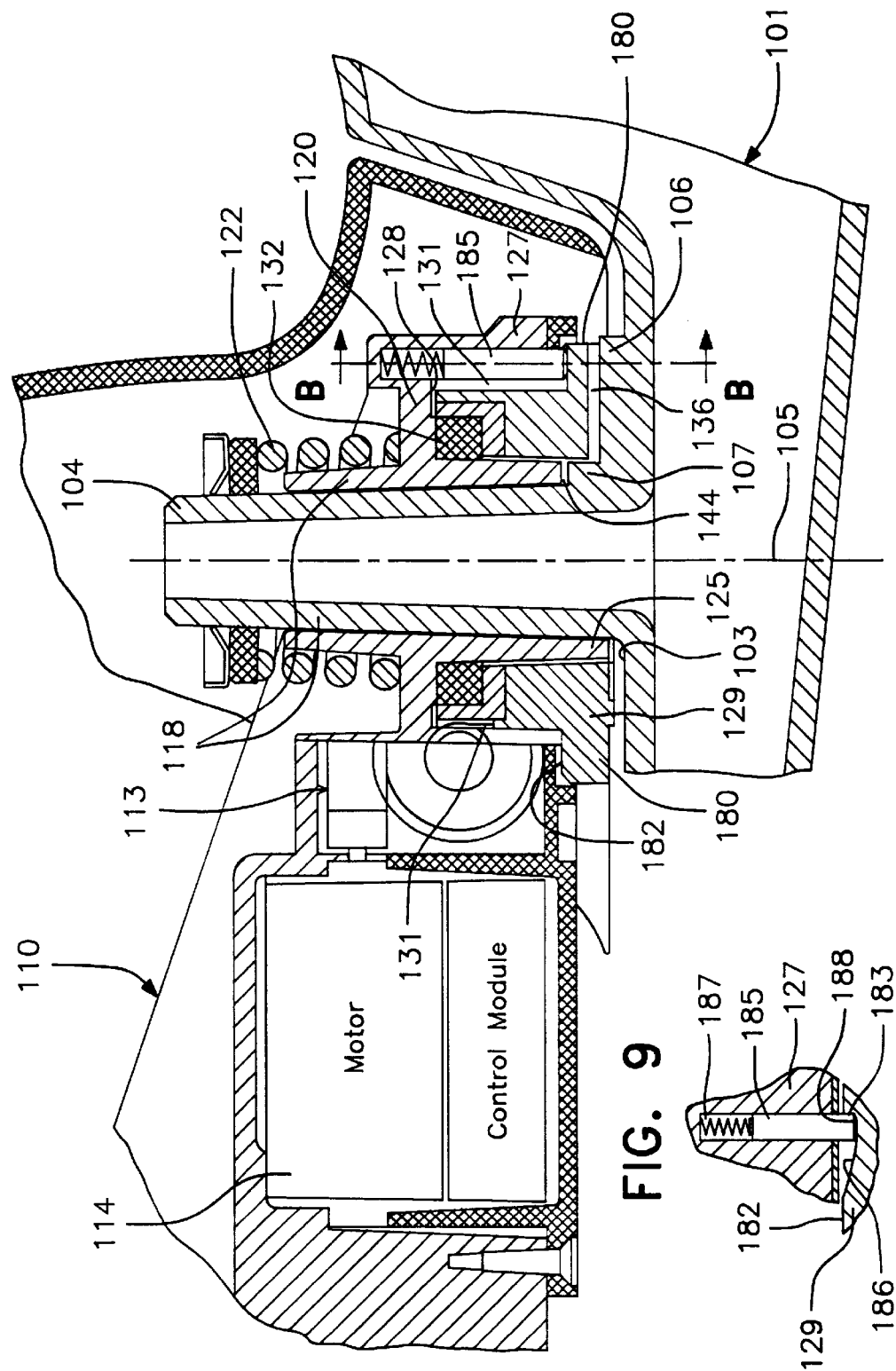

EXTERNAL MIRROR FOR A MOTOR VEHICLE

FIELD OF THE INVENTION

The present invention relates to an external mirror for a vehicle, comprised of a mirror base attachable to the vehicle, a mirror head which bears a mirror, which head can be rotated relative to the base by a motor, mounted on the mirror base by means of an articulation, and when subjected to an impulse can yield in a deflection direction in which it is tilted toward the vehicle from the operating position of the mirror head, wherewith the articulation has a tubular element fixed to the mirror base, and the articulation further has a bushing which is pressed coaxially over the tubular element by a spring, and a mechanism for limiting the rotational excursion of the mirror head around the tubular element.

BACKGROUND OF THE INVENTION

With the external vehicle mirror described in Eur. OS 166,378, the mirror operating position is regulated by an electrical switching mechanism which can be actuated by the mirror head itself, wherewith the positioning motor is shut off when the mirror reaches the operating position. The described mechanism has proved to be unreliable in operation, failing relatively rapidly under environmental stresses to which external mirrors are exposed.

In a different arrangement according to Ger. OS 40 23 375, the electrical switching mechanism is replaced by a mechanically cooperating projection and detent. However, the articulation has a large number of moving parts, rendering the structure of the mirror system complex, as well as costly to manufacture.

The underlying problem overcome by the present invention is to devise an external mirror which operates at least as satisfactorily as mirrors according to the state of the art and is simpler and easier to manufacture.

SUMMARY OF THE INVENTION

Using as a point of departure from the external mirror initially described, this problem is solved according to the invention by means of limiting the motor-driven rotational excursion, which means comprise at least two interacting elements, one of which elements is disposed on the mirror head and the other on a catch piece which is disposed on the articulation coaxially to the tubular element and is driven by the motor, and means of limiting the unintentional-impulse-generated tilting deflection, comprised of a prominence and a detent, wherewith one of these two elements (prominence and detent) is mounted on the mirror base and the other is mounted on the mirror head or on said catch piece.

In this way, catch means for positioning a mirror head in (or restoring it to) its operating position are provided which are reliable over the long term, have few necessary parts, and are easy to assemble; said catch means being realized with the interaction of three structural components, namely the mirror head, the mirror base, and the catch piece.

In a particularly noteworthy embodiment, the element for limiting the rotational excursion disposed on the catch piece is a recess in the surface of the catch piece, which surface faces the bushing or another frame element for the mirror head, and said recess has at least one detent for the rotational excursion of the mirror head. This enables one to use the motor, actuated from the interior of the vehicle, to move the mirror head into a defined operating position (attitude), after the mirror head has been subjected to a rearward impulse which has deflected it in a rearward tilting deflection.

BRIEF DESCRIPTION OF THE DRAWINGS

The invention will be described in more detail hereinbelow with reference to exemplary embodiments illustrated in the accompanying drawings.

FIG. 8 is a view of another embodiment of the invention, corresponding to the view in FIG. 1;

FIG. 9 is a cutaway view of a part of FIG. 8, through line B—B;

DETAILED DESCRIPTION OF THE PREFERRED EMBODIMENTS

Figure 1:
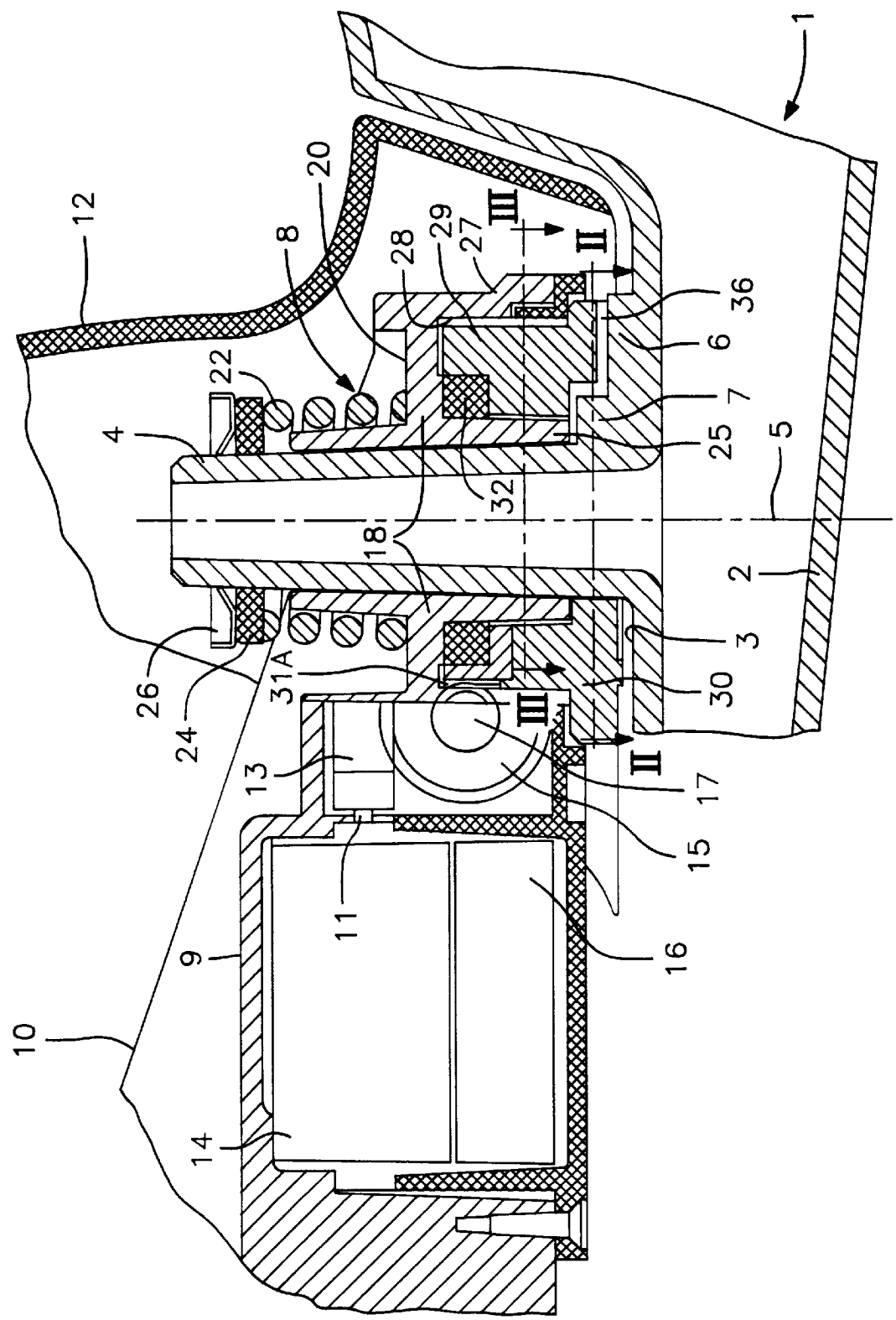
FIG. 1 is an axial cross-section through the articulation, showing parts of the base and head of an external mirror device.

The mirror base 1 shown in part on the right side of FIG. 1 has a mounting device in a region of the base (which region is not illustrated), which mounting device enables the base to be mounted to, for example, the left front door of an automobile. The mirror base 1 has a hollow arm 2 which extends outward from the mounting device of the mirror base.

A hollow tubular element 4 projects from the essentially flat upper side 3 of arm 2. A ridge element 6 having an essentially wedge-shaped cross section extends upward from upper side 3 in the neighborhood of the tubular element 4. The ridge 6 in its longitudinal dimension extends radially with respect to the axis 5 of the tubular element 4. The ridge 6 serves as the first element of a pair of cooperating catch elements (the second catch element being recess 36).

A projection 7, rising from the upper side 3, is disposed between the ridge 6 and the tubular element 4. Projection 7 extends farther upward (normal to surface 3) than does the ridge 6, and undergoes a transition to the outer wall of the tubular element 4.

The mirror head 10 bears a mirror (not shown) and a mirror housing 12 which housing accommodates the various subassemblies of the mirror head 10, e.g., an adjusting mechanism for the mirror, a rotating motor 14 with associated control module 16, and the articulation (bearing assembly) 8 which surrounds the tubular element 4. The articulation 8 is comprised of a bushing 18 which is formed on a structural member (frame) 9 of the mirror head 10 and which surrounds the exterior wall of the tubular element 4, so that the mirror head 10 is rotatable around the axis 5 of the tubular element 4.

A supporting flange 20 extends at approximately the midpoint of the length of the bushing 18. One end of a helical compression spring 22 abuts against flange 20. The upper end of spring 22 rests against a blocking plate 26 via the intermediary of a washer 24. The plate 26 is lodged against the upper end of the tubular element 4, namely in a groove encircling element 4 or against a radially extending prominence (not illustrated) on tubular element 4. In this way, the spring 22 is supported against the tubular element 4 and presses the bushing 18 and thereby the mirror head 10 downward on the tubular element 4.

The bushing 18 has a ring-shaped chamber 28 in its lower region, which chamber is open at the bottom and is generally cup-shaped. A generally ring-shaped catch piece 30 which is not attached to the bushing structure 18 is accommodated in chamber 28.

Chamber 28 is radially delimited on the outer side by a ring-shaped apron member 27 which bears a radially inwardly projecting engaging element 29 (shown in dotted lines in FIG. 1). Chamber 28 is bounded on the radially inward side by the wall 25 of bushing 18 surrounding tubular element 4, and is bounded on the upper side by the supporting flange 20.

The catch piece 30 has an indentation encircling its inner edge. A glide ring 32 is disposed in said indentation, facilitating relative rotation between the bushing 18 and the catch piece 30. The outer periphery of the catch piece 30 has an arcuate groove 34 (FIG. 3) delimited by two rotational-excursion-limiting stop surfaces (31, 33). The circumferential distance between stop surfaces 31 and 33 determines the angle through which the motor can drive the mirror head 10 in rotational movement. As seen from FIG. 3, inwardly projecting engaging-element 29 extends into the groove 34.

Catch piece 30 has a second catch element at its lower side (with ridge 6 being the first catch element), which second element is in the form of a recess 36 extending radially and having a wedge-shaped cross section. The shape and size of recess 36 are adjusted to the shape and size of the corresponding ridge 6. Catch piece 30 also has on its lower end a recess 44 in its radially inner face (FIG. 2), which recess is shaped generally like a cylindrical segment, being delimited in the circumferential direction by two terminal detent steps (41, 43).

Figure 2:
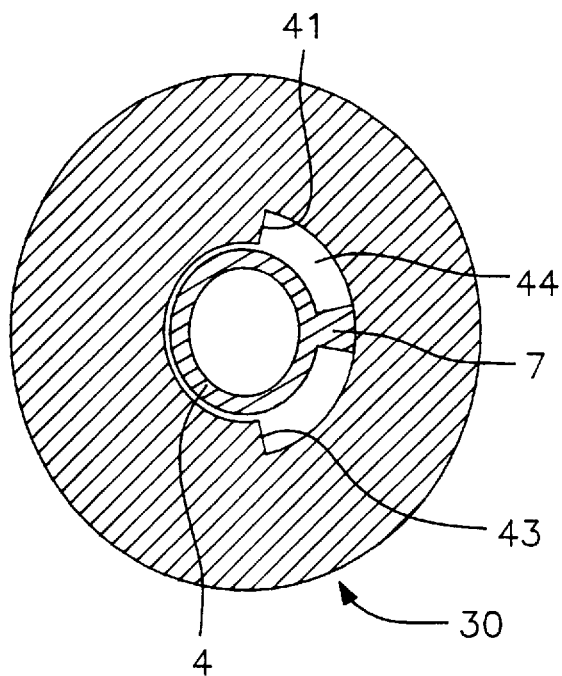
FIG. 2 is a cross-section through line II—II of FIG. 1.

As seen from FIG. 2, the projection 7 extends into the recess 44. The distance separating the detents 41 and 43 in the circumferential direction determines the angle of tilting deflection of the mirror head 10 when it yields rearwardly or forwardly out of its operating position when subjected to an impulse.

The motor 14 for rotating the head 10 is mounted on the structural member (frame) 9. A worm element 13 is attached by key means to the drive shaft 11 of motor 14, and engages a spur gear or the like 15 which is disposed below the worm element 13. Spur gear member 15 is rotationally rigidly fixed to a second worm element 17 which extends perpendicularly to the plane of FIG. 1. An upper, toothed part 31A of catch piece 30 is engaged by and driven by worm element 17. The control module 16 is fixed to structural member (frame) 9 below motor 14.

Figure 3:
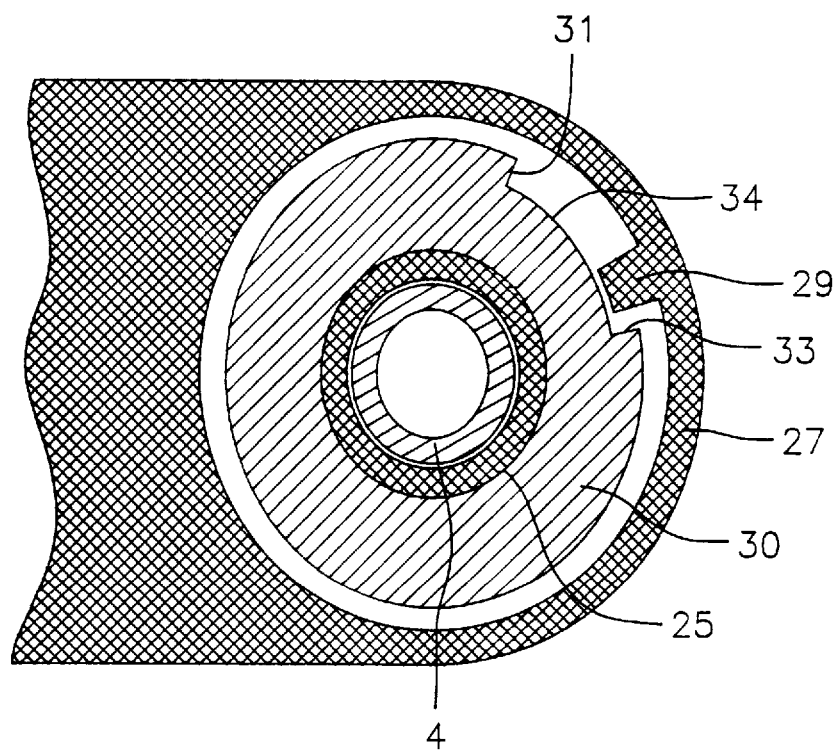
FIG. 3 is a cross-section through line III—III of FIG. 1.

For assembly, the catch piece 30 is slid downward over the tubular element 4 from above, such that ridge 6 (the first catch element) is disposed in the recess 36 (second catch element), and the projection 7 is disposed in the recess 44. Then the bushing 18 bearing the mirror head 10 is slid over the tubular element 4, so that the lower cylindrical wall part 25 of the bushing extends between the catch piece 30 and the tubular element 4 (FIG. 3).

The spring 22 is installed against the flange 20 and the washer 24 is applied over the spring 22. The spring 22 is anchored by applying the blocking plate 26 until the blocking plate 26 interlockingly engages on the tubular element 4. This completes the mounting of the mirror head 10 on the mirror base 1. Therewith, the pitched gear (or the like) 31A engages the worm 17, and the engaging-projection 29 is operatively disposed in the groove 34.

In the operating position of the mirror head 10, the projection 7 is at approximately the midpoint of the circumferential extent of the recess 44, and the inward projection element 29 rests against the first rotational-excursion-limiting stop surface 33. When the control module 16 actuates the rotating motor 14 so as to turn the mirror head 10 toward the vehicle body (not illustrated), the worm 17 acts on the pitched gear 31A of the catch piece 30; however, the piece 30 is held in engagement with the ridge 6 by the compression spring 22, and is thereby held against rotation with respect to the mirror base 1.

Accordingly, when the mirror head 10 (along with the bushing 18) is swung rearwardly (by the motor) with respect to the forward direction of travel of the vehicle, the bushing 18 slides rotationally between the end of the spring 22 and the glide ring 32. During the rotational movement, the position of the projection 29 with respect to the extent of the recess 34 in the rotational direction is changed, until eventually projection 29 comes to rest against the second stop surface 31 (FIG. 3), whereby the rotational excursion of the mirror head 10 is limited. When the rotating motor 14 is actuated by control module 16 to rotate the shaft 11 in the opposite direction, the mirror head is rotated back into the operating position wherein the projection 29 is again disposed abutting the first rotational-excursion-limiting stop surface 33 in the circumferential recess 34.

If the mirror head 10 is subjected to a sufficiently high impulse directed rearwardly, when the swinging motor 14 is not active, the coupling of the catch piece 30 with the worm shaft 17 via the gear 31A will result in a raising of piece 30 axially against the action of spring 22, until the second catch element (the recess) 36 is disengaged from the first catch element (ridge element) 6, whereby the mirror head 10 bearing catch piece 30 can yield to the impulse by tilting rearwardly.

During the tilting, the first detent 43 is moved toward the projection 7, while the ridge 6 glides over the otherwise (other than at the recess 36) flat bottom surface of piece 30. When the detent 43 comes to abut the projection 7, the limit of the tilting has been reached.

When the mirror head is tilted rearward until the limit is reached, the projecting engaging-element 29 is moved from its position adjacent to the first swing-limiting shoulder 33 shown in FIG. 3, through a corresponding counterclockwise arc. When the motor 14 is actuated to return the mirror head 10 to its operating position, first the piece 30 is rotated clockwise without changing the attitude of the mirror head, until the second swing-limiting shoulder 31 moves against the projection 29. Under these conditions, the second catch element (recess) 36 has been returned to a position above the ridge 6, thereby returning piece 30 into engagement with the mirror base 1. As the motor 14 rotates its shaft further, with the catch piece 30 thus engaged, the projection 29 can now be moved relative to piece 30, from the first shoulder 31 to the second shoulder 33 which defines the operating position (FIG. 3), wherewith the mirror head is returned to its operating position. With the first catch element (ridge) 6 and the projection 7 being integrated with the mirror base 1, this operating feature is a consequence of the fact that the circumferential extent of the part of recess 44 between the projection 7 and the first detent 43 is equal to the circumferential extent of the circumferential groove 34, less the angle subtended by the thickness of the projection 29.

If the mirror head is subjected to an impulse directed forward (away from the viewer of FIG. 1), the engagement of the piece 30 with the drive (31A, 17, 13, 11) (FIG. 1)

results in the piece 30 being dislodged from its less secure engagement on the ridge 6 against the action of the spring 22, whereby the mirror head can tilt forward until the projection 7 abuts the second detent 41. During this process the ridge 6 glides along the flat bottom surface of the catch piece 30 (as occurred in the case of a rearwardly directed impulse).

According to another embodiment of the invention, the projection (equivalent to the projection 29 of FIGS. 1 and 3) may extend radially outward from the catch piece (equivalent to the piece 30 of FIGS. 1–3), wherewith the projection engages a circumferential groove in the ring-shaped apron, with the ends of the groove forming the rotational-excursion-limiting stop surfaces (equivalent to stop surfaces 31 and 33 of FIG. 2). Also, the projection (equivalent to projection 7 in FIGS. 1–2) may extend radially inwardly from the catch piece (equivalent to piece 30), into a recess in the wall of the tubular element (equivalent to element 4), with the ends of the recess forming the two detents (equivalent to tilting-deflection-limiting detents 41 and 43).

The inventive embodiment illustrated schematically in FIGS. 4–7 differs in the disposition of the grooves in the catch piece and on the mirror base; further, only one projection (equivalent to projection 7 or element 29) is provided on the mirror head. The free end of the projection performs the function of the above mentioned projection 7, and the part of the projection near the mirror head performs the function of the above mentioned mirror-head-mounted projection 29. The mirror base 50 bears a tubular element 54 (analogous to element 4), which has a peripheral recess 52 having two mutually oppositely directed (in the circumferential direction) detents (56, 58). A catch piece 60 releasably engaged with the mirror base 50 has a recess 62 (the "outer recess") which is delimited by two stop surfaces (66, 68). An inwardly extending dog 72 is provided on the mirror head 70, which dog extends into both the outer recess 62 and the recess 52.

Figure 4:
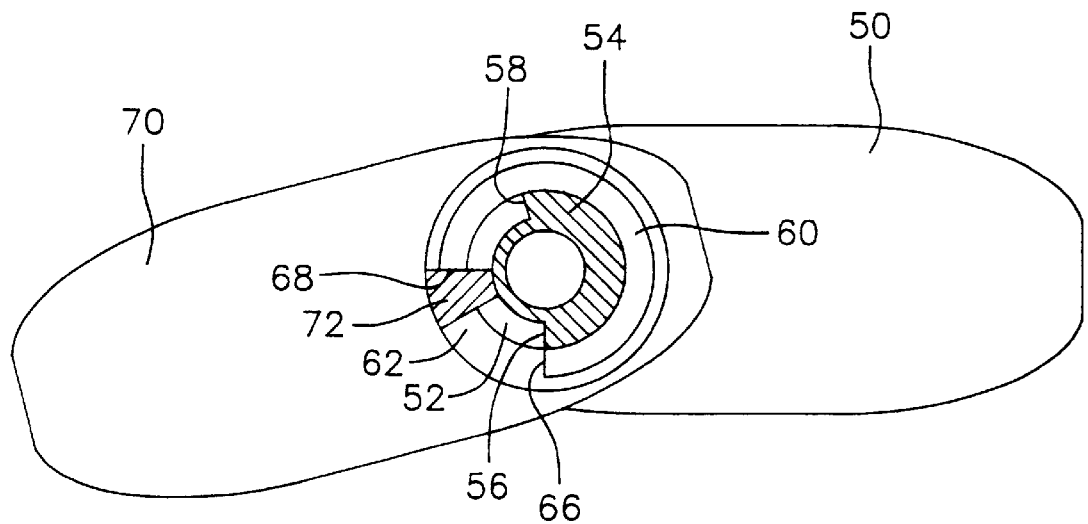
FIGS. 4 to 7 are schematics of individual operating states of a second embodiment of an external mirror device.
Figure 5:
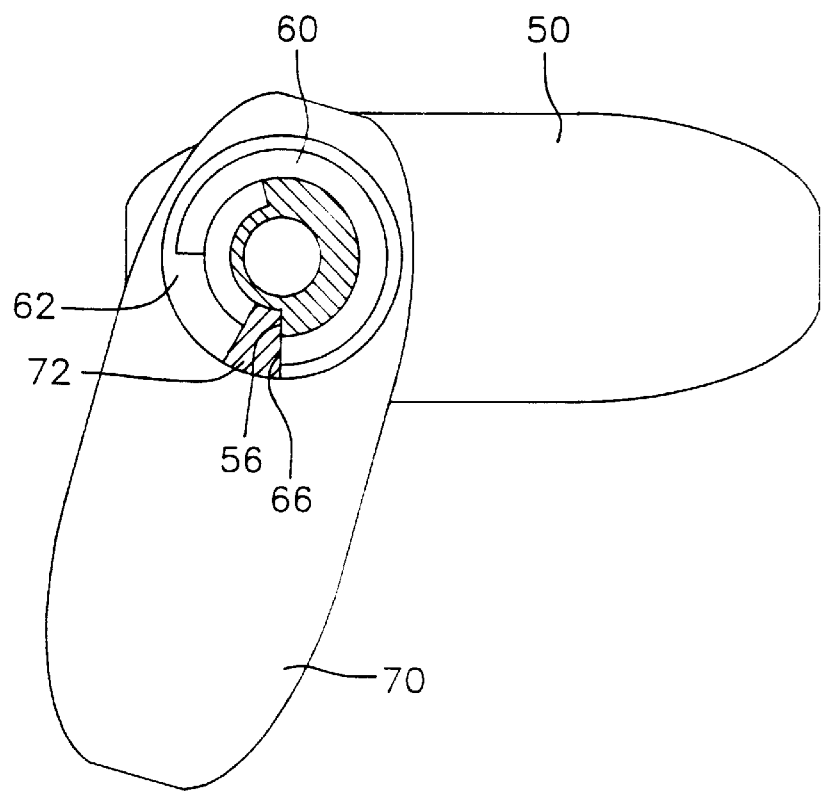

In the operating position of the mirror head 70, shown in FIG. 4, the dog 72 is disposed approximately centrally in the recess 52, whereas in the outer recess 62 it is disposed against the first rotational-excursion-limiting stop surface 68. If the motor (not shown) is actuated to swing the mirror head 70 toward the base 50, i.e. to decrease the angle between head 70 and base 50, the catch element 60 remains engaged with the mirror base 50, wherewith the dog 72 is moved toward the first tilting-deflection-limiting detent 56 in the recess 52 and toward the second stop surface 66 in the outer recess 62, with both the detent 56 and the surface 66 lying along a common radius of the tilt axis (FIG. 5).

Figure 6:
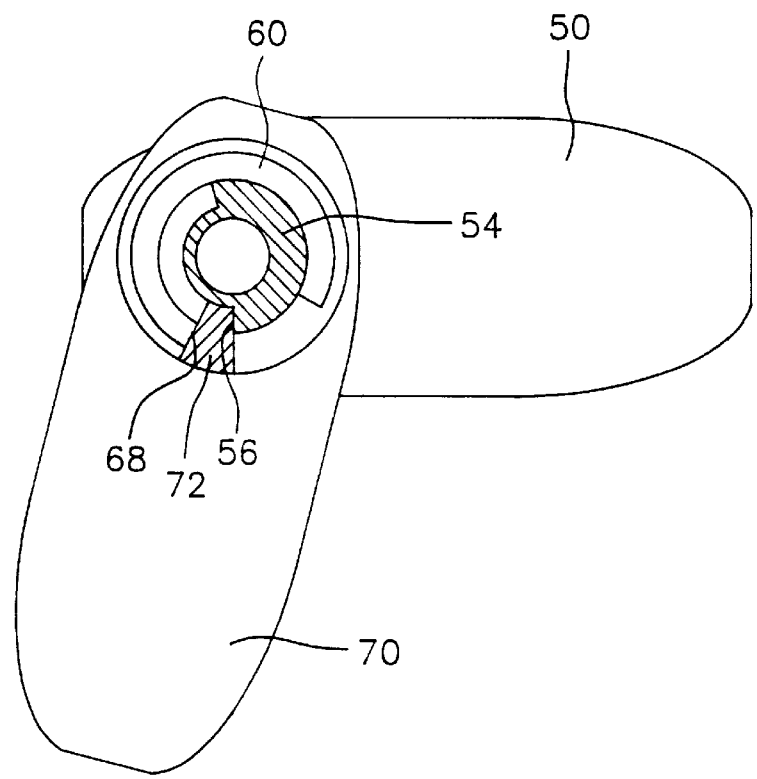
Figure 7:
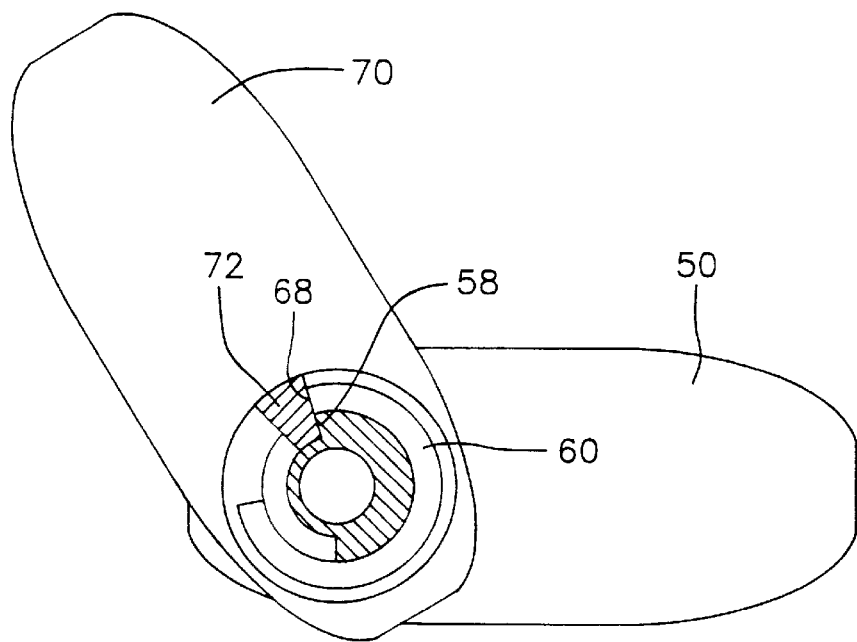

If the mirror head 70 is subjected to a rearward impulse which causes it to tilt out of the operating position shown in FIG. 4 and into the position shown in FIG. 6, the disengaged catch piece 60 is rotated rearward, i.e. counterclockwise in FIGS. 4 and 6, along with the mirror head 70, wherewith the dog 72 remains disposed adjacent the first stop surface 68 but is moved out of the central location in recess 52 and into a position which is again against the first detent 56. From this position, the operating position of the mirror 70 can be restored in the manner described supra in connection with the first exemplary embodiment. If the mirror head is tilted forward (by a forwardly directed impulse) (FIG. 7), the dog 72 remains lodged against the first rotational-excursion-limiting stop surface 68, and the dog 72, along with the disengaged catch piece 60, is moved toward the second detent 58, wherewith the dog 72 comes to abut against the detent 58. Again the motor-driven return of the mirror head to the operating position of FIG. 4 is carried out in the manner described in connection with the first exemplary embodiment.

Within the scope of the invention, the sliding bearing for the bushing 18, which bearing is comprised of the glide ring 32 and the support surface 20, may be replaced by two ball bearings, one of which ball bearings takes the place of the glide ring 32 and the other of which is disposed in a recessed ring in the surface 20 and is provided with a support plate for receiving the thrust of the spring 22.

The inventive embodiment illustrated in FIGS. 8 and 9 has a mirror base 101 and a mirror head 110, with the mirror head 110 being swingable relative to the base 101, around axis 105, by means of a bushing 118 which surrounds a tubular element 104 coaxial to axis 105, which element 104 projects from the upper side 103 of the base 101. The bushing 118 is urged downward onto the element 104 by means of a compression spring 122 which is supported on element 104.

The lower half of bushing 118 forms a ring-shaped chamber 128. Chamber 128 is open on its lower end facing the mirror base 101 and has an outer ring-shaped apron 127, an upper supporting flange 120 against which the compression spring 122 is supported as a thrust element, and an inner wall 125 which constitutes the lower part of the bushing 118. A catch piece 129 is housed in the ring-shaped chamber 128, which piece 129 has a spur gear or the like 131 on the outer part of its upper end. The supporting flange 120 presses the catch piece 129 against the upper side of the mirror base, via the sliding bearing 132 (which alternatively may be a ball bearing).

A first catch element in the form of a radial ridge 106 extends upward from the upper side 103 of the mirror base, and the lower side of the catch piece 129 (facing the upper side 103) has three second catch elements 136 in the form of radial recesses having triangular cross sections, each matching the shape of the first catch ridge 106 and two additional catch ridges. The catch element recesses 136 are equidistant in the circumferential direction, with the angles between neighboring such recesses being 120°.

A projection 107 is formed at the foot of the tubular element 104. Projection 107 extends into a recess 144 of circumferential extent, i.e. a circularly arcuate recess 144 disposed in the circumferential direction, in the wall 125 of the bushing 118, which recess 144 is delimited by two tilting-deflection-limiting detents 141 and 143. It is seen from FIGS. 8 and 10 that the projection 107 does not extend radially beyond the thickness of the wall 125.

The catch piece 129 according to FIG. 8 has a radially outwardly extending ledge 180 which forms a planar annular surface 182 extending transversely to the axis 105. Three downwardly extending recesses (186, 184, 181) are formed in the surface 182, having ramp-shaped bottoms sloping down from surface 182 and terminated by respective axially extending rotational-excursion-limiting stop surfaces (183, 174, 175). The stop surfaces (183, 174, 175) are equidistant in the circumferential direction around the annular surface 182, with the angles between the positions of neighboring such stop surfaces being 120°.

A blind hole 187 parallel to axis 105 is provided in the mass of the ring-shaped apron 127, in which a spring-loaded catch pin 185 is slidably accommodated. The annular surface 182 extends immediately below the opening of bore 187, so that catch pin 185 glides over a circular path on the surface 182 when the catch piece 129 rotates relative to the ring-shaped apron 127 or vice versa and thus relative to the mirror head 110. It is seen that when the mirror head 110 is rotated clockwise (as viewed from above in FIG. 10), carrying the pin 185 with it, the end 188 of pin 185 extending out of the apron 127 and abutting against the surface 182 will encounter one of the stop surfaces (183, 174, 175) if the catch piece 129 is held rotationally fixed.

Figure 10:
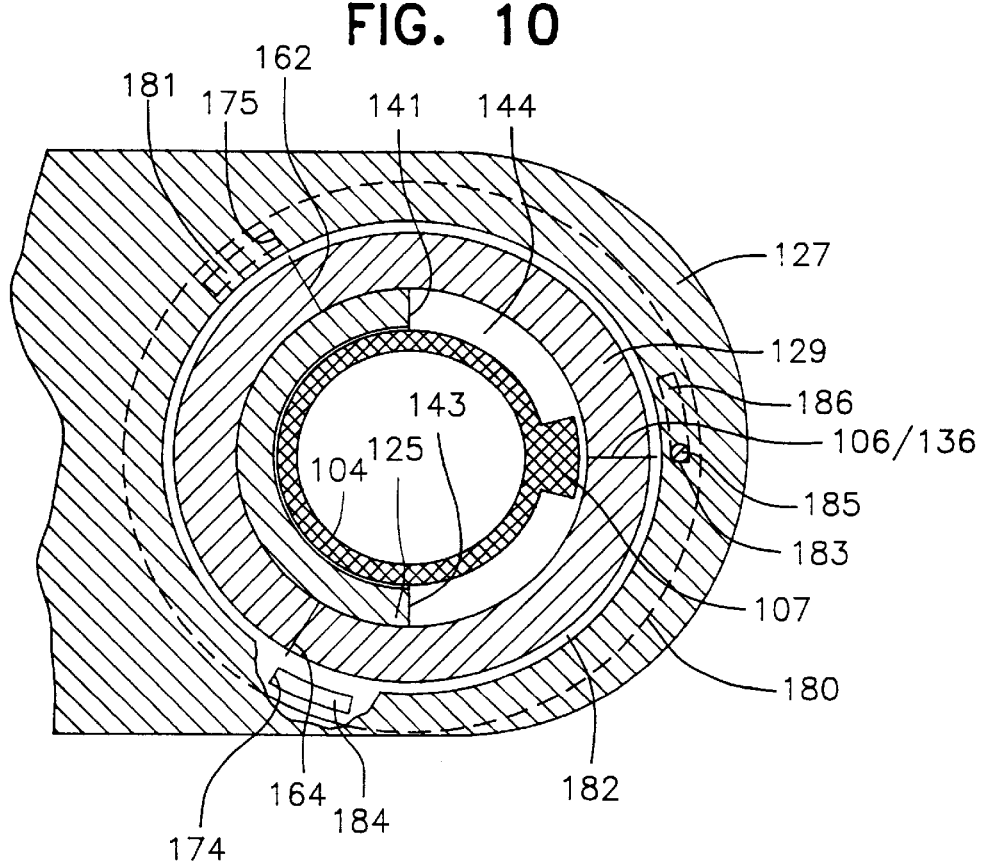
FIG. 10 is a schematic representation of an embodiment similar to the embodiment of FIG. 8.

In FIG. 10 a first catch element pair comprised of the first catch element 106 and the second catch element 136 is designated "106/136". The location of the second such pair is designated 164 and that of the third such pair 162. The second and third pairs correspond to the first pair, in form and in the type of mutual engagability of their catch elements. The catch element pairs are spaced circumferentially at 120° angles.

In the operating position of the mirror head 110 illustrated in FIG. 10, the end 188 of the pin 185 rests against the stop surface 183. When the motor 114 in FIG. 8 of the control module is actuated to tilt the mirror head 110 rearward, i.e. at a lower angle to the vehicle axis, the ring-shaped apron 127 and the wall 125 of bushing 118 are rotated counterclockwise (FIG. 10), while the catch piece 129 remains fixed, being coupled to the tubular element 104 via base 101, by means of the engagement of the second catch element 136 with the first catch element 106. During the motor-driven rearward swinging of the mirror head 110, the pin 185 glides onto the annular surface 182. The end of the available motor-driven excursion is reached when the detent 143 moves against the projection 107.

When the motor is actuated to return the mirror head to the original operating position, this results in a rotation of the apron 127 and the wall 125 in the clockwise direction, until the pin 185 abuts against the stop surface 183 which defines the original operating position.

If the mirror head is subjected to a rearward impulse, with the motor 114 being out of operation, the catch piece 12 9 continues to be coupled to the mirror head 110 via the drive 113, wherewith the catch piece is disengaged from the catch elements 106 of the three catch element pairs 106/(136, 164, 162) and is rotated backward or counterclockwise, along with the mirror head, against the action of the spring 122 acting on piece 129. During this rotation, the pin 185 remains positioned against the stop surface 183. The end position of the yielding is defined by movement of the detent 143 against the projection 107 (as was the case with the motor-driven tilting). When the motor 114 is now actuated, the catch piece 129 is initially rotated clockwise, while the mirror head intentionally remains tilted fully backward because the pin 185 resting against the stop surface 183 does not allow further relative rotation of the catch piece 129 (and thereby the recess 186) relative to the mirror head (and thereby to the pin 185). Eventually the catch elements of the three catch element pairs 106/(136, 164, 162) re-engage. As the catch piece 129 is rotated clockwise during this process, the pin 185 is moved out of engagement with the stop surface 183 and out of the recess 186, and into a position corresponding to the above mentioned motor-driven rearward swinging of the mirror head. If the motor 114 is now further actuated to rotate in the opposite direction, tending to rotate the catch piece 129 counterclockwise, the mirror head then moves back to its original operating position.

If the mirror head 110 is subjected to a forward impulse, the catch piece 129 is disengaged from the catch elements 106 of the three catch element pairs 106/136, 164, 162 and is rotated clockwise along with the ring-shaped apron 127 to the maximum clockwise excursion wherein the detent 141 abuts against the projection 107. If the motor 114 is now actuated to rotate the catch piece 129 clockwise, initially the catch piece rotates clockwise while the mirror head remains tilted forward, until the catch elements of the three catch element pairs 106/136, 164, 162 re-engage. In this situation, the first catch element 106 of a given catch element pair engages with the second catch element (136, 164, or 162) of the catch element pair which is next to the given catch element pair in the counterclockwise direction. During this process, the annular surface 182 having recesses 181, 184, and 186 rotates under the pin 185 of the mirror head 110 (which head is still fully forwardly deflected, with the detent 141 continuing to rest against the projection 107). After the catch element pairs engage, the catch piece 129 is then fixed to the mirror base. If the motor is further actuated (to urge the catch piece 129 in the clockwise direction), the mirror head 110 will tilt backward through the original operating position (in which the pin 185 extends into the recess 181) until the maximum rearward tilt is reached with the detent 143 abutting the projection 107. If the motor is now actuated in the reverse direction, the mirror head 110 will return to the original operating position.

Figure 11:
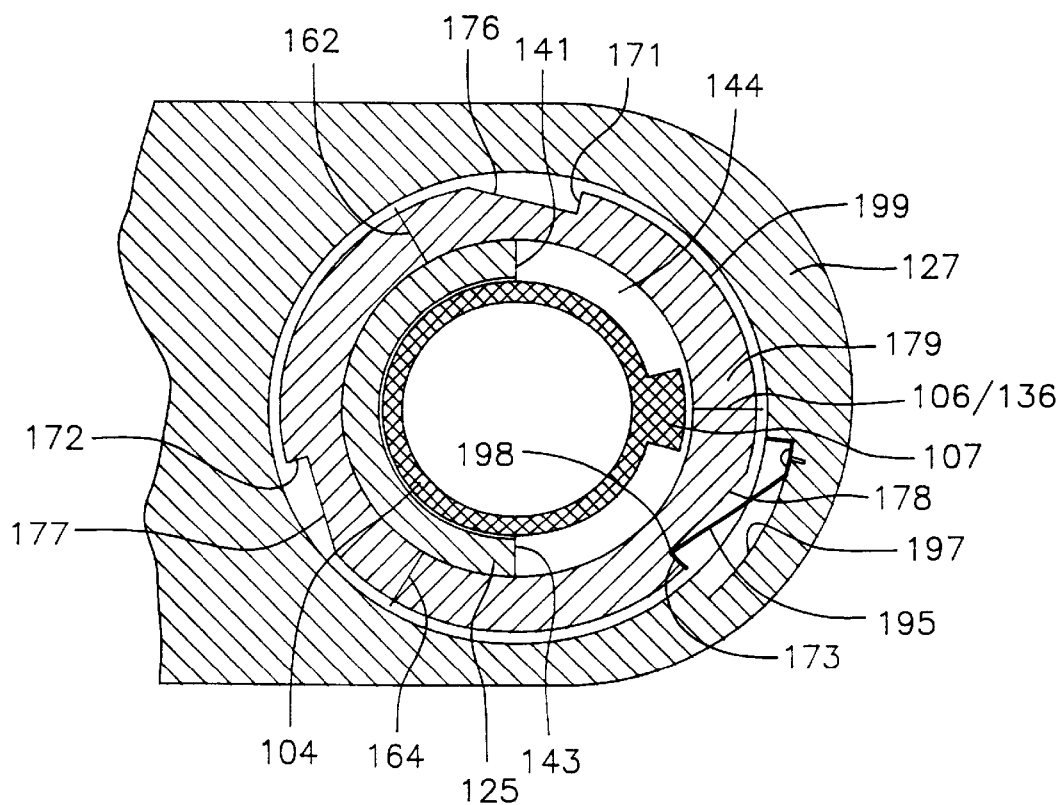
FIG. 11 is a variant embodiment in a view similar to that of FIG. 1.

The inventive embodiment illustrated in FIG. 11 differs from that according to FIGS. 8–10 in particular (among other differences) in that a niche 197 is formed in the circular inner wall of the ring-shaped apron 127. A hook spring 195 is anchored in this niche. The hook-shaped free end (with hook 198) of spring 195 is radially elastic with a spring characteristic whereby it is urged radially into the path of movement of the catch piece 179.

Three notches (178, 177, 176) are formed in the peripheral surface 199 of the catch piece 179. The notches are shaped such that each has a stop surface (173, 172, 171) and are spaced at 120° intervals in the circumferential direction. When the catch piece 179 is rotated counterclockwise, the hook 198 can lodge against one of the stop surfaces (173, 172, 171), to block further counterclockwise rotation of the catch piece 179 relative to the mirror head 110 or clockwise rotation of the mirror head 110 relative to the catch piece 179.

In other respects, this embodiment is the same as described in connection with FIGS. 8–10. It is seen that the hook spring 195 corresponds to the pin 185 with its lower end 188, and the stop surfaces (173, 172, 171) correspond to the stop surfaces (183, 174, 175). The operating behavior of the inventive embodiment shown in FIG. 11 is essentially the same as that described in connection with FIGS. 8–10. As may be seen, the detent 143 also serves as a limit for the rearward swinging of the mirror head by motor action.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. An external mirror for a vehicle, said external mirror comprising:
   a mirror base attachable to the vehicle,
   a mirror head including a mirror, said mirror head being rotatable within a rotational excursion relative to said mirror base by a motor, said mirror head being mounted on said mirror base by a tubular element fixed to the mirror base and a bushing of said mirror head pressed coaxially over the tubular element by a spring, said mirror head having a tilting deflection upon receiving a tilting impulse such that said mirror head can yield in the direction in which it is tilted form an operating position of said mirror head;

at least two interacting catch elements for limiting the rotational excursion of said mirror head, one of said catch elements being disposed on said mirror head and the other of said catch elements being disposed on a catch piece, said catch piece being disposed coaxially about said tubular element and being driven by the motor, said catch piece engaged with said mirror base and releasable therefrom when subjected to a tilting impulse and a projection and a detent for limiting the tilting deflection of said mirror head, one of said projection and said detent being mounted on the mirror base and the other being mounted on one of said mirror head and said catch piece.

2. A mirror according to claim 1, wherein said catch piece is rotatably housed in a ring-shaped chamber surrounding said bushing.

3. A mirror according to claim 2, wherein said ring-shaped chamber is formed from said bushing and parts of a frame providing support to said mirror head.

4. A mirror according to claim 1, wherein said one element of said two interacting elements disposed on said mirror head is one of a radially acting hook spring and a spring-loaded axially acting pin.

5. An external mirror for a vehicle, said external mirror comprising:

a mirror base attachable to the vehicle;

a mirror head including a mirror, said mirror head being rotatable within a rotational excursion relative to said mirror base by a motor, said mirror head bing mounted on said mirror base by a tubular element fixed to the mirror base and a bushing of said mirror head pressed coaxially over the tubular element by a spring, said mirror head having a tilting deflection upon receiving a tilting impulse such that said mirror head can yield in the direction in which it is tilted from an operating position of said mirror head;

at least two interacting catch elements for limiting the rotational excursion of said mirror head, one of said catch elements being disposed on said mirror head and the other of said catch elements being disposed on a catch piece, said catch piece being disposed coaxially about said tubular element and rotatably housed in a ring-shaped chamber formed from said bushing and part of a supporting frame of said mirror head and being driven by the motor, wherein said catch piece engages with said mirror base by a catch mechanism which is releasable when subjected to a tilting impulse;

a projection and a detent for limiting the tilting deflection of said mirror head, one of said protection and said detent being mounted on the mirror base and the other being mounted on one of said mirror head and said catch piece.

6. A mirror according to claim 5, wherein said ring-shaped chamber is open in a direction toward a component fixed to said mirror base, and one element of said catch mechanism is mounted on a surface of said catch piece and a second element of said catch mechanism is mounted on said mirror base.

7. A mirror according to claim 6, wherein said other element of said at least two interacting elements mounted on said catch piece comprises a recess located on said surface of said catch piece, said surface is directed toward the bushing, wherein said recess has at least one stop surface to stop rotational movement of said mirror head.

8. A mirror according to claim 7, wherein a plurality of additional recesses are provided on said catch piece which are uniformly spaced apart in the circumferential direction.

9. A mirror according to claim 8, wherein a plurality of pairs of catch elements are equidistantly spaced in a circumferential direction on said mirror base.

10. A mirror according to claim 7, wherein said recess is a circumferential groove, the ends of which constitute rotational-excursion-limiting stop surfaces; and said one element of said at least two interacting elements disposed on said mirror head is a projection which extends into said circumferential groove.

11. A mirror according to claim 10, wherein said detent comprises a circumferential recess and said projection extends into said circumferential recess, and the ends of said circumferential recess limit tilting deflection of said mirror head.

12. A mirror according to claim 11, wherein said projection extends into both said circumferential groove and said circumferential recess.

13. An external mirror for a vehicle, said external mirror comprising:

a mirror base attachable to the vehicle, a mirror head including a mirror, said mirror head being rotatable within a rotational excursion relative to said mirror base by a motor, said mirror head being mounted on said mirror base by a tubular element fixed to the mirror base and a bushing of said mirror head pressed coaxially over the tubular element by a spring, said mirror head having a tilting deflection upon receiving a tilting impulse such that said mirror head can yield in the direction in which it is tilted form an operating position of said mirror head;

at least two interacting catch elements for limiting the rotational excursion of said mirror head, one of said catch elements being disposed on said mirror head and the other of said catch elements being disposed on a catch piece, said catch piece being disposed coaxially about said tubular element and being driven by the motor, wherein said catch piece engages with said mirror base by a catch mechanism which is releasable when subjected to a tilting impulse, and a projection and a detent for limiting the tilting deflection of said mirror head, one of said projection and said detent being mounted on the mirror base and the other being mounted on one of said mirror head and said catch piece.

14. An external mirror for a vehicle, said external mirror comprising:

a mirror base attachable to the vehicle, a mirror head including a mirror, said mirror head being rotatably mounted on said mirror base and being rotatable within a first rotational excursion relative to said mirror base by a motor, and being deflectable within a second rotational excursion that is greater than said first rotational excursion when said mirror head is subjected to an impulse;

a catch piece engaging said mirror base by a catch mechanism and engaging said mirror head through a motor mounted within said mirror head, said catch mechanism being releasable from said mirror base when said mirror head is subjected to an impulse;

at least two interacting catch elements for limiting the first rotational excursion of said mirror head, one of said catch elements being disposed on said mirror head and the other of said catch elements being disposed on said catch piece;

a projection and a detent for limiting the second rotational excursion of said mirror head, one of said projection and said detent being mounted on the mirror base and the other being mounted on one of said mirror head and said catch piece.

15. The external mirror of claim 14 wherein said mirror head is rotatably mounted on said mirror base by the engagement of a bushing on said mirror head pressed coaxially over a tubular element fixed to said mirror base.

* * * * *